(12) United States Patent
Johnson et al.

(10) Patent No.: US 7,962,323 B2
(45) Date of Patent: Jun. 14, 2011

(54) CONVERTING DEPENDENCY GRAMMARS TO EFFICIENTLY PARSABLE CONTEXT-FREE GRAMMARS

(75) Inventors: Mark Johnson, Redmond, WA (US); Robert C. Moore, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 917 days.

(21) Appl. No.: 11/683,165

(22) Filed: Mar. 7, 2007

(65) Prior Publication Data
US 2008/0221869 A1 Sep. 11, 2008

(51) Int. Cl.
G06F 17/20 (2006.01)
(52) U.S. Cl. .................. 704/1; 704/9; 704/10; 704/257
(58) Field of Classification Search .................. 704/1, 9, 704/257, 10
See application file for complete search history.

(56) References Cited

U.S. PATENT DOCUMENTS

| | | | |
|---|---|---|---|
| 4,829,423 A | 5/1989 | Tennant | |
| 5,060,155 A | 10/1991 | Van Zuijlen | |
| 5,475,588 A * | 12/1995 | Schabes et al. | 704/9 |
| 6,138,098 A | 10/2000 | Shieber | |
| 6,188,977 B1 * | 2/2001 | Hirota | 704/9 |
| 6,243,669 B1 | 6/2001 | Horiguchi | |
| 6,332,118 B1 * | 12/2001 | Yamabana | 704/9 |
| 6,714,905 B1 | 3/2004 | Chang | |
| 6,983,239 B1 | 1/2006 | Epstein | |
| 6,985,852 B2 | 1/2006 | Wang | |
| 7,181,386 B2 * | 2/2007 | Mohri et al. | 704/1 |
| 2003/0074187 A1 * | 4/2003 | Ait-Mokhtar et al. | 704/9 |
| 2005/0234701 A1 * | 10/2005 | Graehl et al. | 704/2 |
| 2006/0155526 A1 * | 7/2006 | Castillo et al. | 704/1 |
| 2006/0245641 A1 | 11/2006 | Viola | |
| 2006/0253273 A1 * | 11/2006 | Feldman et al. | 704/9 |

OTHER PUBLICATIONS

Nasr et al. "A simple string-rewriting formalism for dependency grammar". Proceedings of the Workshop on Recent Advances in Dependency Grammar, 2004, pp. 25-32.*
Johnson. "Deductive parsing with multiple levels of representation". In 26th Annual Meeting of the Association for Computational Linguistics, Buffalo, New York, 1988, pp. 241-248.*
McDonald et al. "Online learning of approximate dependency parsing algorithms". In Proc.of the 11th Conf. of the European Chapter of the Association for Computational Linguistics, Apr. 2006, pp. 81-88.*
Wang et al. "A statistical constraint dependency grammar (CDG) parser". In Workshop on Incremental Parsing: Bringing Engineering and Cognition Together, 2004, pp. 1-8.*
Eisner et al. "Parsing with soft and hard constraints on dependency length". In Proc. of IWPT, Oct. 2005, pp. 30-41.*
Johnson, "Transforming projective bilexical dependency grammars into efficiently-parsable CFGs with unfold-fold", proceedings of the 45th annual meeting of the Association of computational linguistics, pp. 168-175, Jun. 2007.*
J. Eisner "Bilexical Grammars and Their Cubic-Time Parsing Algorithms" Dept. of Computer Science, Rochester, NY 2000, 33 pages.
J. Earley, "An Efficient Context-Free Parsing Algorithm" University of California, Berkeley, 1970, 9 pages.

(Continued)

*Primary Examiner* — Qi Han
(74) *Attorney, Agent, or Firm* — Joseph R. Kelly; Westman, Champlin & Kelly, P.A.

(57) ABSTRACT

Dependency grammars are transformed to context-free grammars. The context-free grammars can be used in a parser to parse input sentences and identify relationships among words in the sentence.

18 Claims, 8 Drawing Sheets

OTHER PUBLICATIONS

M. Nederhof, E. Bertsch, "An innovative finite state concept for recognition and parsing of context free languages" Publication, 1999, 20 pages.

J. Eisner, "Three New Probabilistic Models for Dependency Parsing: An Exploration", CIS Dept., University of Pennsylvania, 1996, 6 pages.

J. Eisner, G. Satta, "Efficient Parsing for Bilexical Context-Free Grammars and Head Automation Grammars", Proc. of the 37th ACL, 1999. 8 pages.

D. McAllester a reformulation of Eisner and Sata's cubic time parser for split head automata grammars, two (2) slides, 1999, 2 pages.

R. McDonald, "Discriminative Learning and Spanning Tree Algorithms for Dependency Parsing" PhD thesis, Computer and Information Science, University of Pennsylvania, 2006, 240 pages.

J. Eisner, "Bilexical Grammars and a Cubic-Time Probabilistic Parser", Dept. of Computer and Information Science, University of Pennsylvania, 2000, 45 pages.

* cited by examiner

CONVERTING DEPENDENCY GRAMMARS TO EFFICIENTLY PARSABLE CONTEXT-FREE GRAMMARS

BACKGROUND

Current natural language processing techniques utilize a grammar to analyze input strings. Dependency grammars and context-free grammars are two different types of grammars used for analyzing input strings. Different algorithms are currently used to parse dependency grammars and context-free grammars. Developing and analyzing parsing algorithms for separate grammars can be time consuming and expensive.

The discussion above is merely provided for general background information and is not intended to be used as an aid in determining the scope of the claimed subject matter.

SUMMARY

Dependency grammars are transformed to efficiently parsable context-free grammars. The context-free grammars can be used in a parser to parse input sentences and identify relationships among words in the sentence.

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
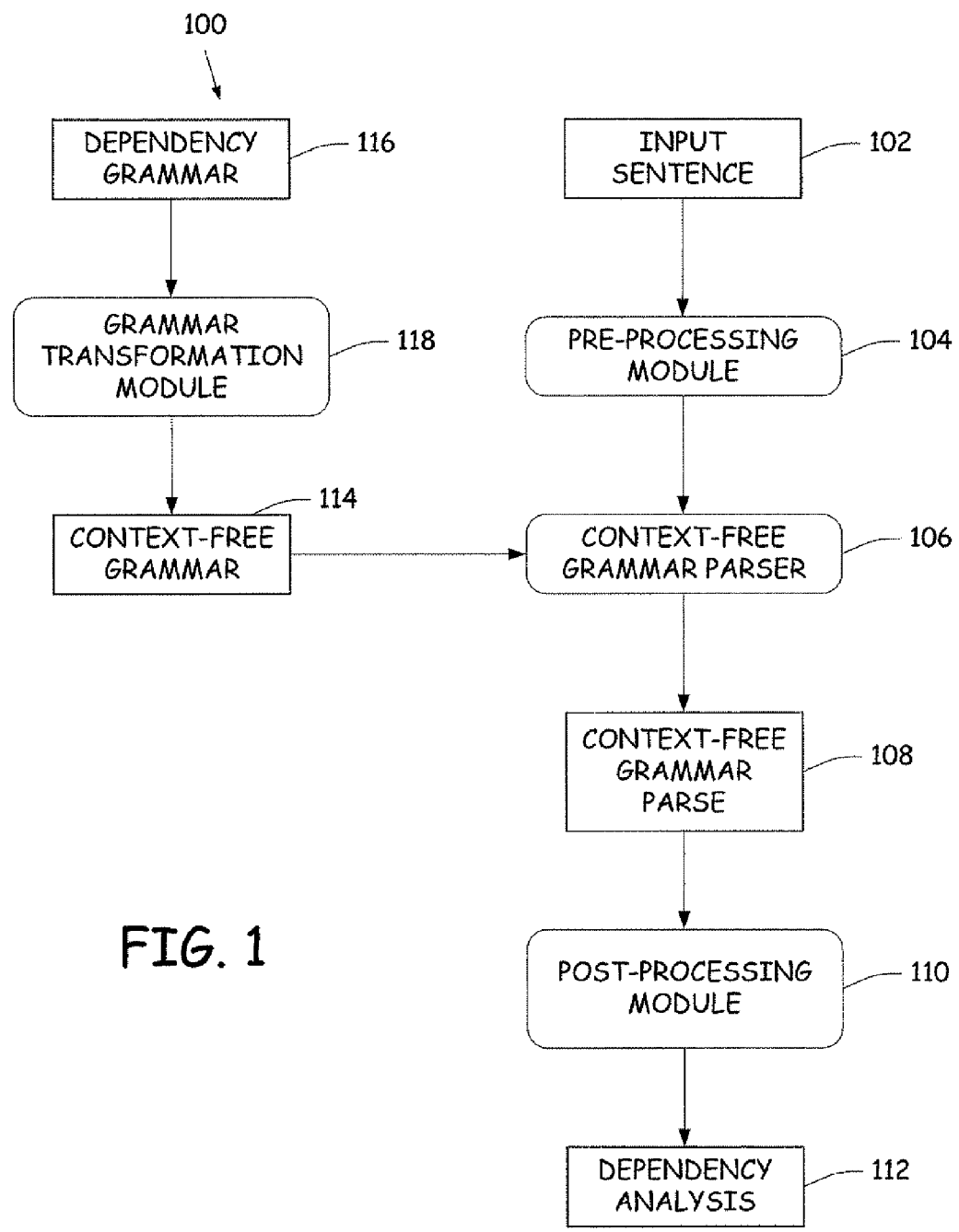
FIG. 1 is a block diagram of an environment for analyzing a sentence.

FIG. 1 is a block diagram of an environment 100 for analyzing input sentences. An input sentence 102 is sent to a pre-processing module 104. Input sentence 102 can be from any source such as text from a document, recognized text from a speech recognizer, etc. Pre-processing module 104 pre-processes input sentence 102 by converting the input sentence 102 into a sequence of tokens corresponding to the terminal symbols of context-free grammar 114. In one embodiment, each word u in input sentence 102 is converted into two unique terminals identified as a left variant $u_l$ and a right variant $u_r$. Context-free grammar (CFG) parser 106 then parses input sentence 102 as pre-processed by pre-processing module 104, according the productions specified by context-free grammar 114. CFG parser 106 outputs a CFG parse 108. The CFG parse 108 in sent to post-processing module 110. Post-processing module 110 converts the CFG parse 108 to a dependency analysis 112. The dependency analysis 112 indicates words and dependents thereof of sentence 102. In particular, the dependency analysis 112 is a tree which has vertices labeled with words and a root terminal. CFG parser 106 utilizes a CFG 114 that is obtained from a dependency grammar 116 that is transformed using a grammar transformation module 118.

Figure 2:
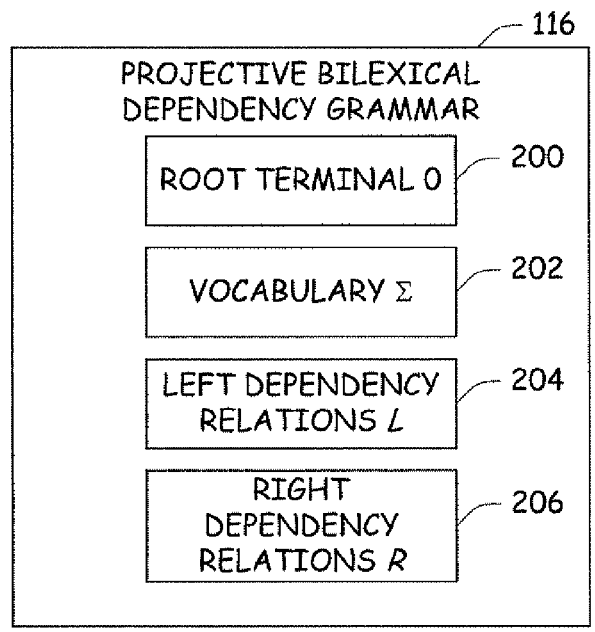
FIG. 2 is a block diagram of a dependency grammar.

FIG. 2 is a block diagram of dependency grammar 116. Dependency grammar 116 includes a root terminal 200, a vocabulary 202, a list L of possible left dependencies (a left dependency is a pair of vocabulary items and optionally a weight) 204 and a list R of possible right dependencies (a right dependency is a pair of vocabulary items and optionally a weight) 206. Root terminal 200 can be represented as 0 and vocabulary 202 can be represented as a finite set of terminals (e.g. words) $\Sigma$. Input sentence 102 can be represented as words $w=(w_1, \ldots, w_n)$ in vocabulary 202. A dependency grammar 116 generates parses for an input sentence 102.

A dependency parse G for w is a tree (i.e., a connected acyclic directed graph in which each vertex has at most one incoming arc) whose vertices are labeled with root terminal 200 and words in input sentence 102. Terminals in parse G can be represented as u and v. If G contains an arc from u to v then v is a dependent of u, and if G contains a path from u to v then v is a descendant of u. If v is a dependent of u that also precedes u in the input sentence 102 then v is a left dependent of u (right dependent and left and right descendants are defined analogously).

Figure 3:
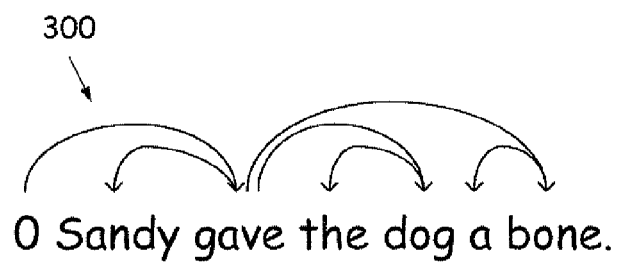
FIG. 3 is a diagram of a parse from a dependency grammar.

A dependency parse C is projective if, whenever there is a path from u to v, then there is also a path from u to every word between u and v in the input sentence as well. FIG. 3 depicts a projective dependency parse 300 for the sentence "Sandy gave the dog a bone". Parse 300 includes an arc from root terminal 0 to the word "gave".

A projective dependency grammar defines a set of projective dependency parses. A Projective Bilexical Dependency Grammar (PBDG) includes two relations, a left relation and a right relation. A PBDG generates a projective dependency parse G if and only if all right dependencies (u, v) in G appear in R and all left dependencies (u, v) in G appear in L. The language generated by a PBDG is a set of strings that have projective dependency parses generated by the dependency grammar. In parse 300, the word "gave" has a left dependent "Sandy" and the right dependencies "dog" and "bone". Additionally, "dog" has a left dependent "the" and "bone" has a left dependent "a".

A weight can also be associated with each dependency in the lists L and R of left and right dependencies, respectively, in the dependency grammar. These weights can be used to weight the productions of a PCFG. Standard methods for converting weighted CFGs to equivalent PCFGs can be used if required. Alternatively, one can transform a corpus of dependency parses into a corpus of the corresponding CFG parses, and estimate CFG production probabilities directly from that corpus.

Figure 5:
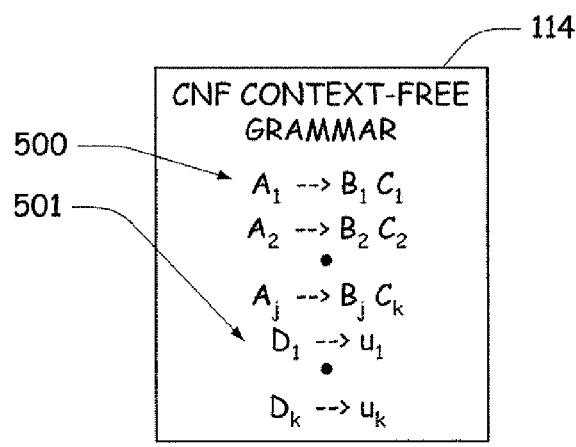
FIG. 5 is a block diagram of a context-free grammar in Chomsky Normal Form (CNF).
Figure 4:
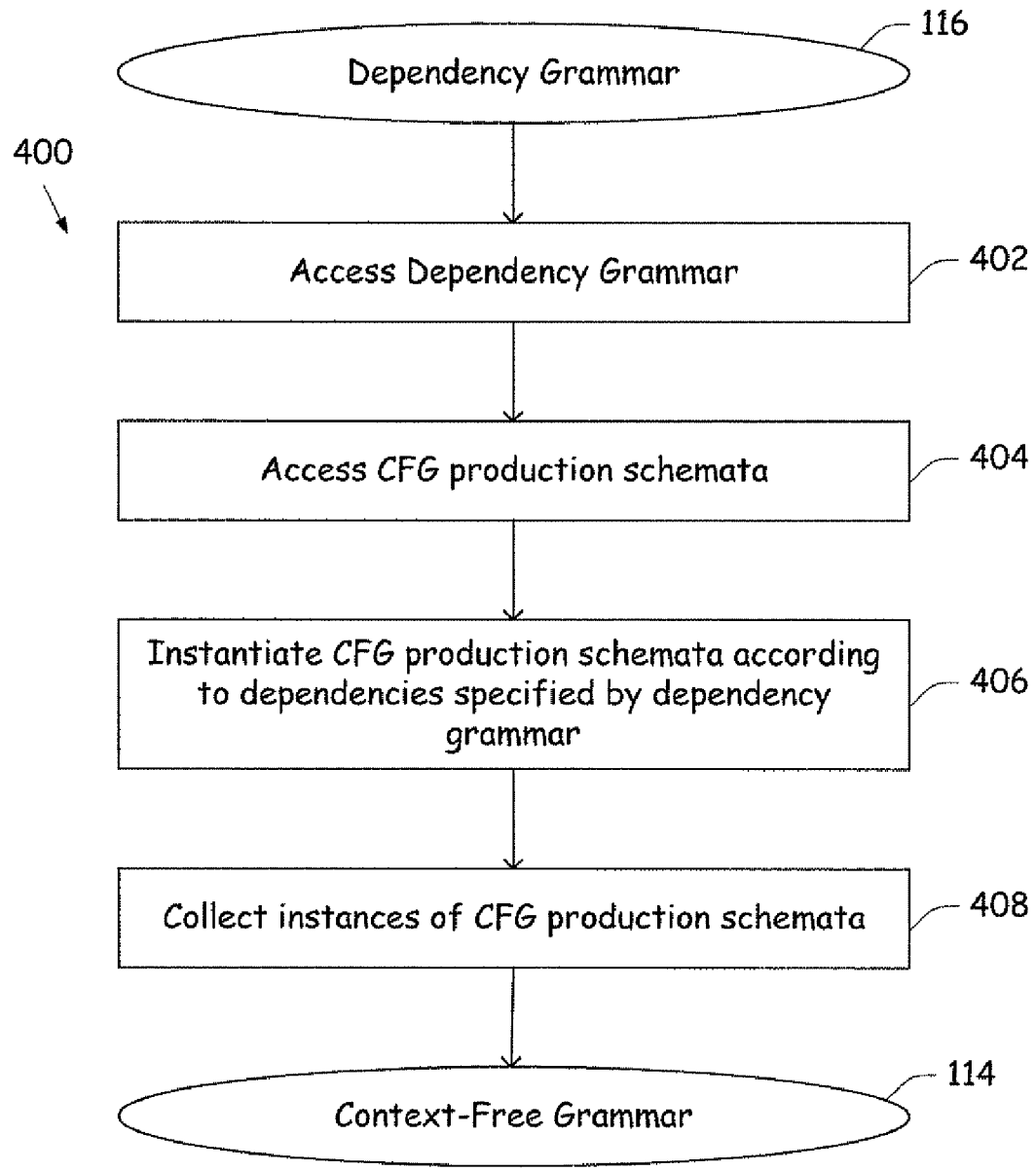
FIG. 4 is a flow diagram of a method for converting a dependency grammar to a context-free grammar.

In order to utilize CFG parsing techniques to generate parse 300, dependency grammar 116 can be transformed to CFG 114 using grammar transformation module 118. FIG. 4 is a flow diagram of a method 400 for converting dependency grammar 116 to CFG 114 using grammar transformation module 118. FIG. 5 is an example of CFG 114, which includes a plurality of rules (or productions) 500 of the form A→B C, and D→u. In each of the plurality of rules, A, B, C and D are nonterminal symbols and u is a terminal symbol. Rules 500 rewrite to non-terminals while rules 501 rewrite to terminals. These rules are expressed in what is known as Chomsky Normal Form, which is a form for expressing grammars.

Within method 400, there are several embodiments for transforming Projective Bilexical Dependency Grammars to Context-Free Grammars in Chomsky Normal Form (CNF) that can be used alone or in combination. A known basic transformation produces a Context-Free Grammar whose parses require a large number of computer operations to construct. This transformation can be modified to produce other Context-Free Grammars whose parses require fewer computer operations to produce. The various embodiments of method 400 differ in exactly what transformation is involved, and can produce Context-Free Grammars with different properties. For example, the second embodiment of method 400, which is referred to as the BILEXICAL SPLIT-HEAD TRANSFORM, produces Context-Free Grammars whose parses require $O(n^3)$ computer operations to produce, where n is the number of words in the sentence being parsed. The third embodiment of method 400, which is referred to as the ADJACENT SPLIT-HEAD TRANSFORM, produces Context-Free Grammars that model the interaction between adjacent dependents of the same head and still only require $O(n^3)$ computer operations to produce a parse. The fourth embodiment of method 400, which is referred to as the DEPENDENT SPLIT-HEAD TRANSFORM, produces Context-Free Grammars that model the interaction between a head, its dependent, and a dependent of its dependent, and still only require $O(n^3)$ computer operations to produce a parse.

Method 400 includes accessing dependency grammar 116 at step 402 and accessing$_{[b1]}$ CFG production schemata 404. At step 406, the CFG production schemata are instantiated according to dependencies specified in dependency grammar 116. Instances of the CFG production schemata are collected at step 408 to produce the Context Free Grammar 114. Embodiments of method 400 are described below for producing efficiently parseable CGFs.

Basic Transformation from Dependency Grammar to Context Free Grammar

The basic transformation produces a Context-Free Grammar that is easy to understand but whose parses require $O(n^5)$ computational steps to construct. This transformation involves accessing a dependency grammar, for example dependency grammar 116. The basic transformation also involves accessing and instantiating CFG production schemata. To instantiate the CFG production schemata, a nonterminal is introduced for each word in vocabulary 202. For example, each terminal $u \in \Sigma$ is associated with a corresponding nonterminal $X_u$ that expands to u and all of u's dependants. Dependency grammar 116 is represented as a CFG using a start symbol S and symbols $X_u$ for each terminal $u \in \Sigma$. Productions of the CFG produced are the instances of the following schemata:

$S \rightarrow X_u$ where u is a left dependant of 0
$X_u \rightarrow u$ where $u \in \Sigma$
$X_u \rightarrow X_v X_u$ where v is a left dependent of u
$X_u \rightarrow X_u X_v$ where v is a right dependent of u This CFG in general requires a significant amount of time to parse. In particular, the parsing time can be expressed in what is called Big O notation, which is used to describe asymptotic behavior of functions. The CFG above requires a $O(n^5)$ parsing time, where n is the number of words in the sentence being parsed, with a conventional CFG parsing algorithm such as the CKY (Cocke-Kasami-Younger) parsing algorithm, since tracking head annotations u and v multiplies the standard $O(n^3)$ CFG parse time requirements by an additional factor proportional to the $O(n^2)$ instances of the production schemata expanding $X_u$. The CKY parsing algorithm is a bottom-up parsing algorithm.

Figure 6:
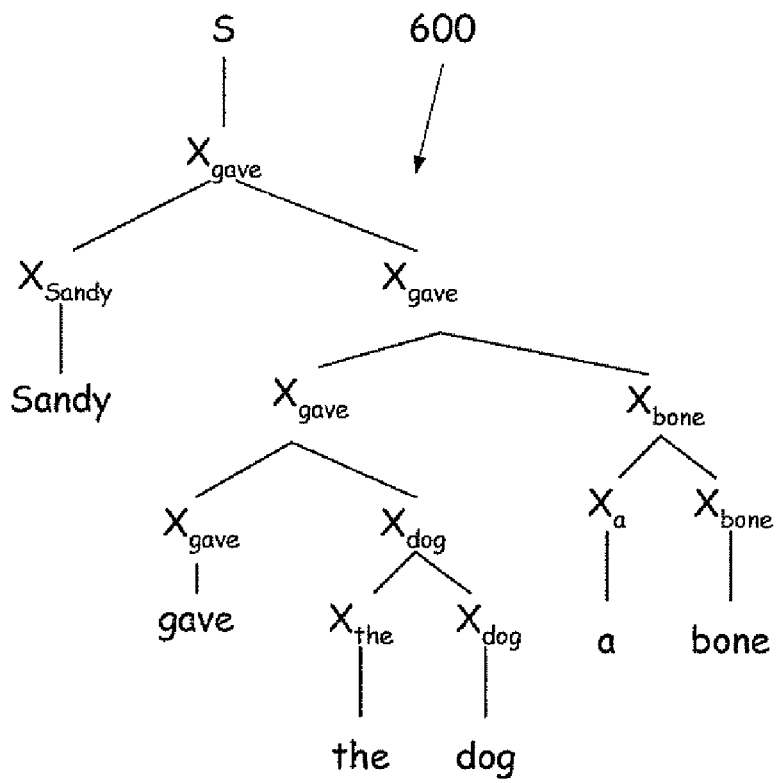
FIG. 6 is a diagram of two parses from a context-free grammar.
Figure 6:
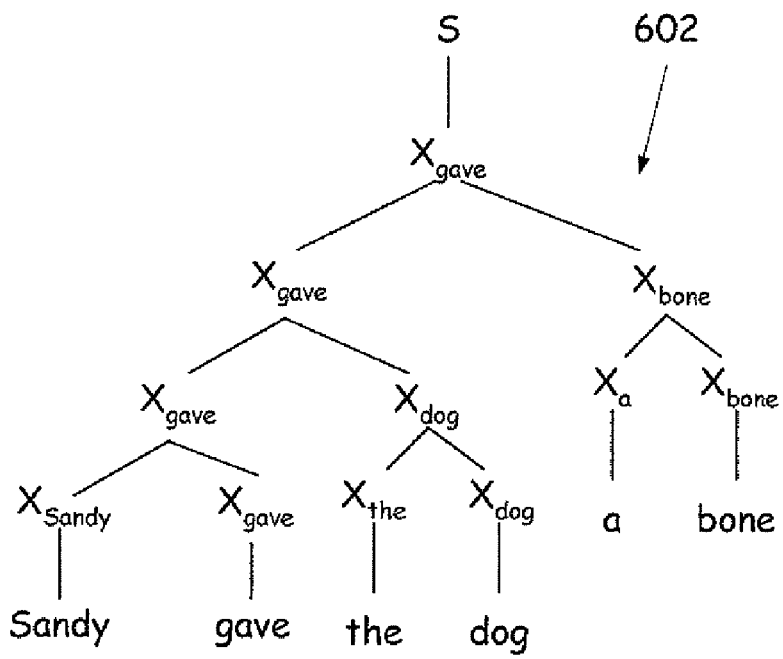

An additional problem is that this CFG can exhibit spurious ambiguities, i.e., a single dependency parse may correspond to more than one CF parse. FIG. 6 illustrates a first parse 602 and a second parse 604 that can be derived from the sentence "Sandy gave the dog a bone". There are several ways of removing the spurious ambiguities in the CFG just described. One such way is referred to as "split-head encoding", which removes the ambiguities and serves as a starting point for grammar transforms described below.

Basic Split-Head Transform

The first embodiment of method 400, which is referred to as the BASIC SPLIT-HEAD TRANSFORM, utilizes split-head encoding to represent the dependency grammar as a Context-Free Grammar. Split-head encoding represents each word u in the input string by two distinct, unique terminals, $u_l$ and $u_r$. A split-head CFG's terminal vocabulary is $\Sigma' = \{u_l, u_r : u \in \Sigma\}$, where $\Sigma$ is the set of terminals of the PBDG. A PBDG parse with yield $w = (u_1, \ldots, u_n)$ is transformed to a split-head CFG parse with yield $w' = (u_{1,l}, u_{l,r}, \ldots, u_{n,l}, u_{n,r})$. Thus in one embodiment, pre-processing module 104 produces a sequence of tokens for input to the CFG parser that differs from the input required by a standard dependency parser in that each terminal u in the dependency parser input is replaced by the pair of terminals $u_l$ $u_r$ in the CFG parser input. The BASIC SPLIT-HEAD TRANSFORM, transforms a PBDG into a CFG whose productions include the instances of the following schemata:

$S \rightarrow X_u$ where u is a left dependent of 0
$X_u \rightarrow L_u\, _uR$ where $u \in \Sigma$
$L_u \rightarrow u_l$ where $u \in \Sigma$
$L_u \rightarrow X_v L_u$ where v is a left dependent of u
$_uR \rightarrow u_r$ where $u \in \Sigma$
$_uR \rightarrow _uR X_v$ where v is a right dependent of u In this CFG, each $X_u$ immediately dominates two new categories, $L_u$ and $_uR$. $L_u$ dominates $u_l$ and all of u's left descendants, while $_uR$ dominates $u_r$ and all of u's right descendants. This means that the indices are redundant and do not need to be computed (thus saving O(n) time) because their value can be determined by examining the spans of terminals that these categories dominate. As can be seen by examining the split-head schemata, the right-most descendant of $L_u$ is always $u_l$, and the left-most descendant of $_uR$ is always $u_r$, so these subscript indices are redundant given the string positions of the constituents. Thus, the indices on $L_u$ and $_uR$ can be deleted, and recovered from the constituent's span if required However, the split-head encoding CFG requires $O(n^4)$ parsing time because the index v on $X_v$ is not redundant. The spurious ambiguity present in the prior art encoding does not arise in the CFGs produced by the BASIC SPLIT- HEAD TRANSFORM because the left and right dependents of a head are collected independently and cannot intermingle.

The split-head CFG can encode additional information if desired. For example, head automata proposed by Eisner and Satta in a paper entitled, "Efficient Parsing for Bilexical Context-Free Grammars and Head Automaton Grammars", In *Proceedings of the 37$^{th}$ Annual Meeting of the Association for Computational Linguistics*, pages 457-480 (1999), can be included. This additional information corresponds to refining or adding additional state information to the non-terminals $L_u$ and $_uR$. The grammar transformations described below all apply to grammars in which these nonterminals are further refined in this way.

It is possible to directly parse "undoubled" input strings by modifying both the CFG parser 106 and the CFGs described herein by modifying $L_u$ and $_uR$ so they both ultimately expand to the terminal u, and special-case the application of production $X_u \to L_u \, _uR$ and all productions derived from it to permit $L_u$ and $_uR$ to overlap on the terminal u. That is, the doubling of the terminal string is avoided by modifying the CFG parser so that it requires each terminal to be generated twice, once by $L_u$ or a nonterminal derived from it, and once by $_uR$ or a nonterminal derived from it. This means that it is possible to avoid doubling the input tokens during the preprocessing step, by suitable modification of the CFG parsing algorithm. In such embodiments, the preprocessing module 104 may does no more than split the sentence into a sequence of tokens, and the CFG parser 106 is modified so that it parses this sequence directly.

Bilexical Split-Head Transform

The second embodiment of method 400 for converting a PBDG into a CFG is referred to as the BILEXICAL SPLIT-HEAD TRANSFORM. This embodiment can take as its input the CFG produced by the BASIC SPLIT-HEAD TRANSFORM and transform it further. However, it is not necessary to produce the CFG resulting from the BASIC SPLIT-HEAD TRANSFORM of our method in order to apply the BILEXICAL SPLIT-HEAD TRANSFORM. Instead, one can practice the BILEXICAL SPLIT-HEAD TRANSFORM simply by instantiating the production schemata discussed below.

The parsing time of the BASIC SPLIT-HEAD TRANSFORM can be reduced to $O(n^3)$ parsing time by transforming the split-head grammar using a suitable transform such as an Unfold-Fold transform. In an Unfold-Fold transform, a production in the grammar can be "unfolded" or expanded to its descendants and a sequence of terminals and nonterminals on the right hand side of a production can be "folded" into body of another production. Thus, the Unfold-Fold transformation is used to transform $L_u$; the transformation of $_uR$ is symmetric. From above, the definition of $L_u$ in the split-head grammar ("|" separates the right-hand sides of productions) can be represented as:

$L_u \to u_l | X_v \, L_u$ where v is a left dependent of u

First, $X_v$ is unfolded in $L_u$, i.e., replace $X_v$ by its expansion, producing the following definition for $L_u$.

$L_u \to u_l | L_v \, _vR \, L_u$ where v is a left dependent of u

This unfold removes the $X_v$ in $L_u$ which was responsible for the $O(n^4)$ parse time of the CFG produced by the BASIC SPLIT-HEAD TRANSFORM, but the resulting definition of $L_u$ contains ternary productions and so still incurs $O(n^4)$ parse time. To address this situation, new nonterminals $_xM_y$ for each x, y∈Σ are introduced as follows:

$_xM_y \to _xR \, L_y$ and the children $_vR \, L_u$ in $L_u$ are folded into $_vM_u$, yielding the following grammar:

$_xM_y \to _xR \, L_y$ where x, y∈Σ
$L_u \to u_l | L_v \, _vM_u$ where v is a left dependent of u The CFG produced by the BILEXICAL SPLIT-HEAD TRANSFORM is obtained by unfolding the occurrence of $X_u$ in the S production and dropping the $X_u$ schema, as $X_u$ no longer appears the right-hand side of any production. Thus the CFG produced by the BILEXICAL SPLIT-HEAD TRANSFORM can be directly instantiated from the PBDG given as input by instantiating the following schemata:

$S \to L_u \, _uR$ where u is a right dependent of 0
$L_u \to u_l$ where u∈Σ
$L_u \to L_v \, _vM_u$ where v is a left dependant of u
$_uR \to _uM_v \, _vR$ where v is a right dependant of u
$_uR \to u_r$ where u∈Σ
$_xM_y \to _xR \, L_y$ where x,y∈Σ

Figure 7:
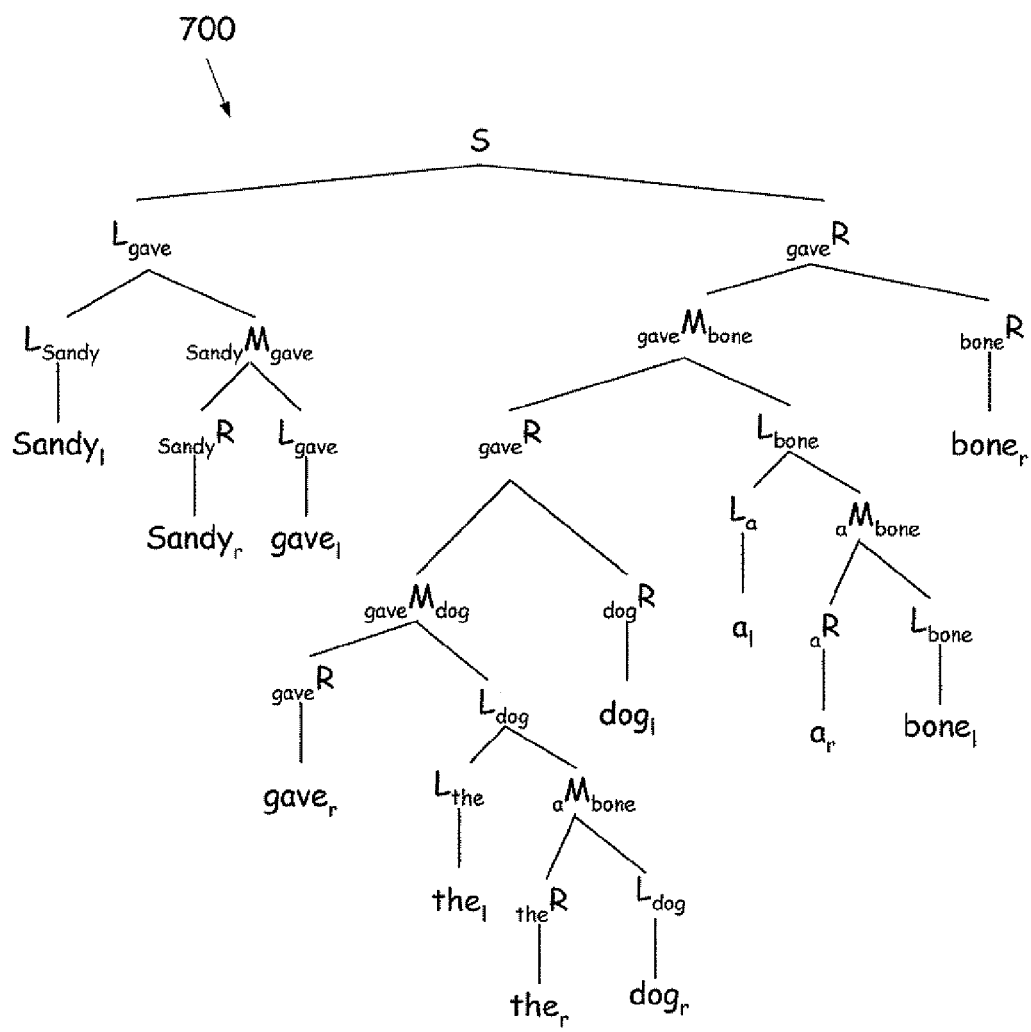
FIG. 7 is a diagram of a parse from a context-free grammar.

The CFG produced by the BILEXICAL SPLIT-HEAD TRANSFORM requires $O(n^3)$ parsing time to parse because the indices are redundant given the constituent's string positions. That is, they can be deleted from the CFG and recovered by examining the spans of the constituents when required. FIG. 7 is a parse 700 using the $O(n^3)$ CFG above.

Adjacent Split-Head Transform

A third embodiment of method 400 for converting PBDGs to CFGS, is referred to as ADJACENT SPLIT-HEAD TRANSFORM. This embodiment of method 400 can also be understood as an additional transformation of the grammar produced by the BASIC SPLIT-HEAD TRANSFORM. However, the Context-Free Grammars produced by the ADJACENT SPLIT-HEAD TRANSFORM can also be constructed by directly instantiating the schemata given below.

The split-head grammar produced by the BASIC SPLIT-HEAD TRANSFORM can be transformed into a form that encodes second-order dependencies between adjacent dependent heads in an adjacent-head transformation grammar. A derivation for the $L_u$ constituents is provided and there is a parallel derivation for $_uR$. $X_v$ can be unfolded in the definition of $L_u$ in the split-head grammar, producing as before:

$L_u \to u_l | L_v \, _vR \, L_u$

In the ADJACENT SPLIT-HEAD TRANSFORM, a new nonterminal $_vM_u^L$ is introduced, which is a specialized version of M requiring that v is a left-dependent of u.

$_vM_u^L \to _vR \, L_u$ where v is a left dependent of u
$L_u \to u_l | L_v \, _vM_u^L$; where v is a left dependent of u Now unfold $L_u$ in the definition of $_vM_u^L$, producing:

$_vM_u^L \to _vR \, u_l | _vR \, L_{v'} \, _{v'}M_u^L$;

Note that in the first production expanding $_vM_u^L$, v is the closest left dependent of u, and in the second production v and v' are adjacent left-dependents of u. $_vM_u^L$ has a ternary production, so $_xM_y$ is introduced as before to fold two of its children constituents into.

$_xM_y \to _xR \, L_y$ where x,y∈Σ
$_vM_u^L \to _vR u_l | _vM_{v'} \, _{v'}M_u^L$; where v' is a left dependent of u and v is a left dependent adjacent to v'

Figure 8:
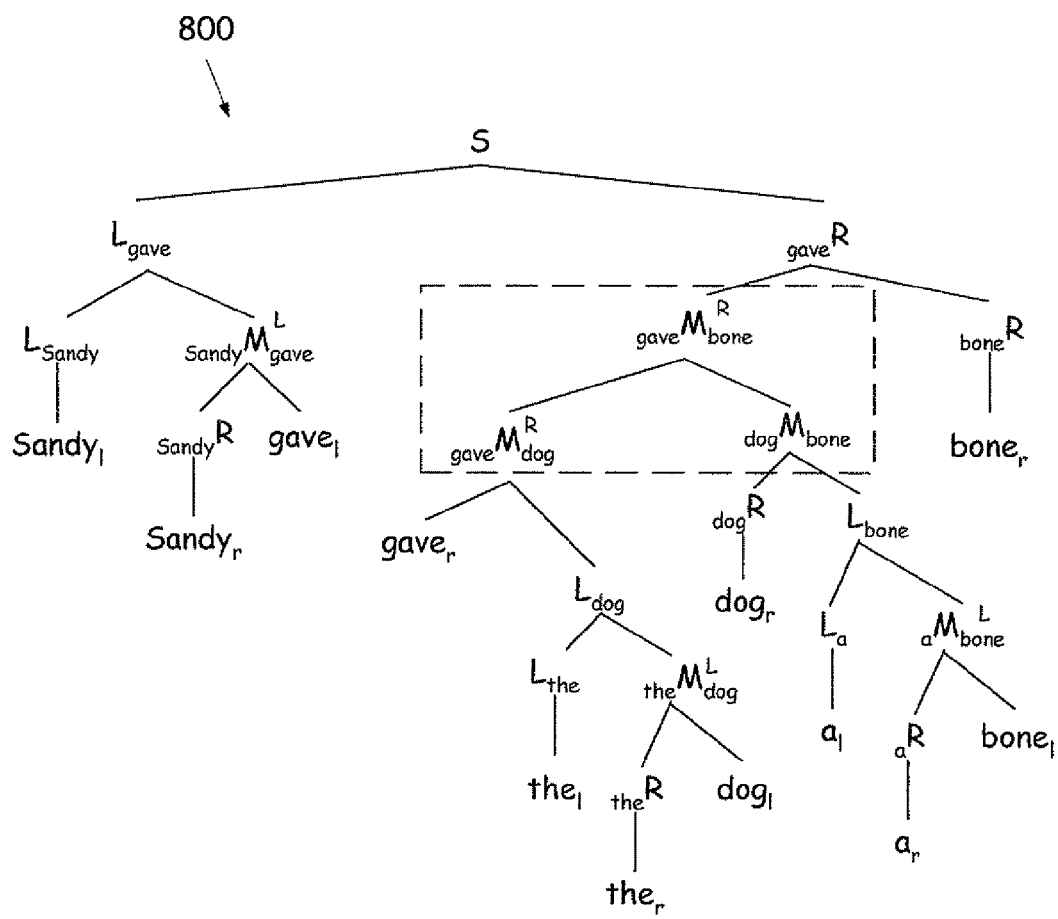
FIG. 8 is a diagram of a parse from a context-free grammar.

The resulting grammar schema is as below, and a sample parse 800 is given in FIG. 8. The CFG produced by the ADJACENT SPLIT-HEAD TRANSFORM of our method can be obtained directly by instantiating these schemata; it is not necessary to apply the BASIC SPLIT-HEAD TRANSFORM first.

$S \to L_u \, _uR$ where u is a left descendent of 0
$L_u \to u_l$ u has no left dependents
$L_u \to L_v \, _vM_u^L$ v is u's last left dependent
$_vM_u^L \to _vR \, u_l$ v is u's closest left dependent
$_vM_u^L \to _vM_{v'} \, _{v'}M_u^L$ where v' is a left dependent of u and v is a left dependent adjacent to v'
$_uR \to u_r$ u has no right dependents
$_uR \to _uM_v^R \, _vR$ v is u's last right dependent
$_uM_v^R \to u_r \, L_v$ v is u's closest right dependent
$_uM_v^R \to _uM_{v'}^R \, _{v'}M_v$ where v' is a right dependent of u and v is a right dependent adjacent to v'
$_xM_y \to _xR \, L_y$ where x, y∈Σ

As before, the indices on the nonterminals are redundant, as the heads are always located at an edge of each constituent, so the indices need not be computed or stored and the CFG can be parsed in $O(n^3)$ time. The indices can be recovered when required by examining the terminal spans of the constituents.

Dependent Split-Head Transform

The fourth embodiment of method 400, which is referred to as the DEPENDENT SPLIT-HEAD TRANSFORM, applies the Unfold-Fold transform in a different way to capture head-to-head-to-head dependencies, i.e., "vertical" second-order dependencies, rather than the "horizontal" ones captured by the ADJACENT SPLIT-HEAD TRANSFORM.

In the DEPENDENT SPLIT-HEAD TRANSFORM, the dependent $_vR$, rather than the head $L_u$, is unfolded in the initial definition of $_vM_u^L$. This results in a grammar that tracks vertical, rather than horizontal, second-order dependencies. Since left-hand and right-hand derivations are assembled separately in a split-head grammar, the grammar in fact only tracks zig-zag type dependencies (e.g., where a grandparent has a right dependent, which in turn has a left dependent).

Figure 9:
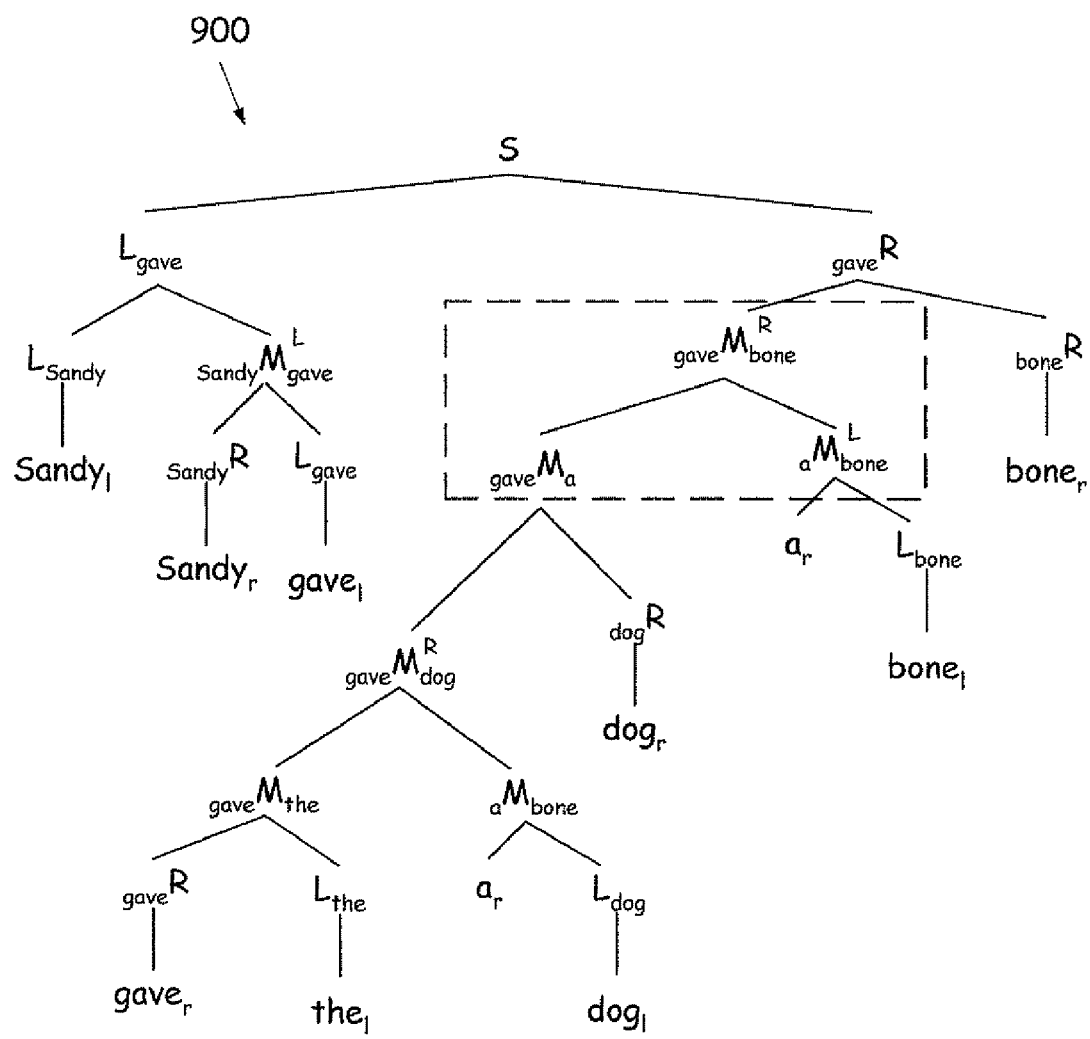
FIG. 9 is a diagram of a parse from a context-free grammar.

The resulting grammar is given below, and a sample parse 900 using this grammar is shown in FIG. 9. Since the subscripts are redundant, the CFG can be parsed in $O(n^3)$ time using the CKY algorithm. The CFG produced by the DEPENDENT SPLIT-HEAD TRANSFORM can be obtained directly by instantiating these schemata.

$S \rightarrow L_u \, _uR$ where u is a left dependent of 0
$L_u \rightarrow u_l$ where $u \in \Sigma$
$L_u \rightarrow L_v \, _vM_u^L$ where v is a left dependent of u
$_vM_u^L \rightarrow u_r \, L_u$ where v is a left dependent of u
$_vM_u^L \rightarrow _vM_w^R \, _wM_u$ where v is a left dependent of u and w is a right dependent of v
$_uR \rightarrow u_r$ where $u \in \Sigma$
$_uR \rightarrow _uM_v^R \, _vR$ where v is a right dependent of u
$_uM_v^R \rightarrow _uR \, v_l$ where v is a right dependent of u
$_uM_v^R \rightarrow _uM_w \, _wM_v^L$ where v is a right dependent of u and w is a left dependent of v
$_xM_y^v \rightarrow _xR \, L_y$ where $x,y \in \Sigma$ Using the embodiments discussed above, techniques for parsing CFGs can be applied to PBDGs. For example, incremental and predictive CFG parsing algorithms can be used, as can the Inside-Outside algorithm and maximum posterior decoding (MPD). MPD is straightforward given the PBDG to CFG reductions described in this application. Specifically, we use the Inside-Outside algorithm to compute the posterior probability of the CFG constituents corresponding to each PBDG dependency, and then use the Viterbi algorithm to find the parse tree that maximizes the sum of these posterior probabilities.

The embodiments above show how to translate PBDGs into CFGs that can be parsed in $O(n^3)$ time. One component of these embodiments is a split-head construction, where each word u in the input is split into two terminals $u_l$ and $u_r$ of the CFG parse. Transforms of the split-head CFG can also be used to track second-order dependencies such as horizontal and vertical dependencies. By increasing a number of non-terminals still further, it is possible to track additional information about constituents.

Figure 10:
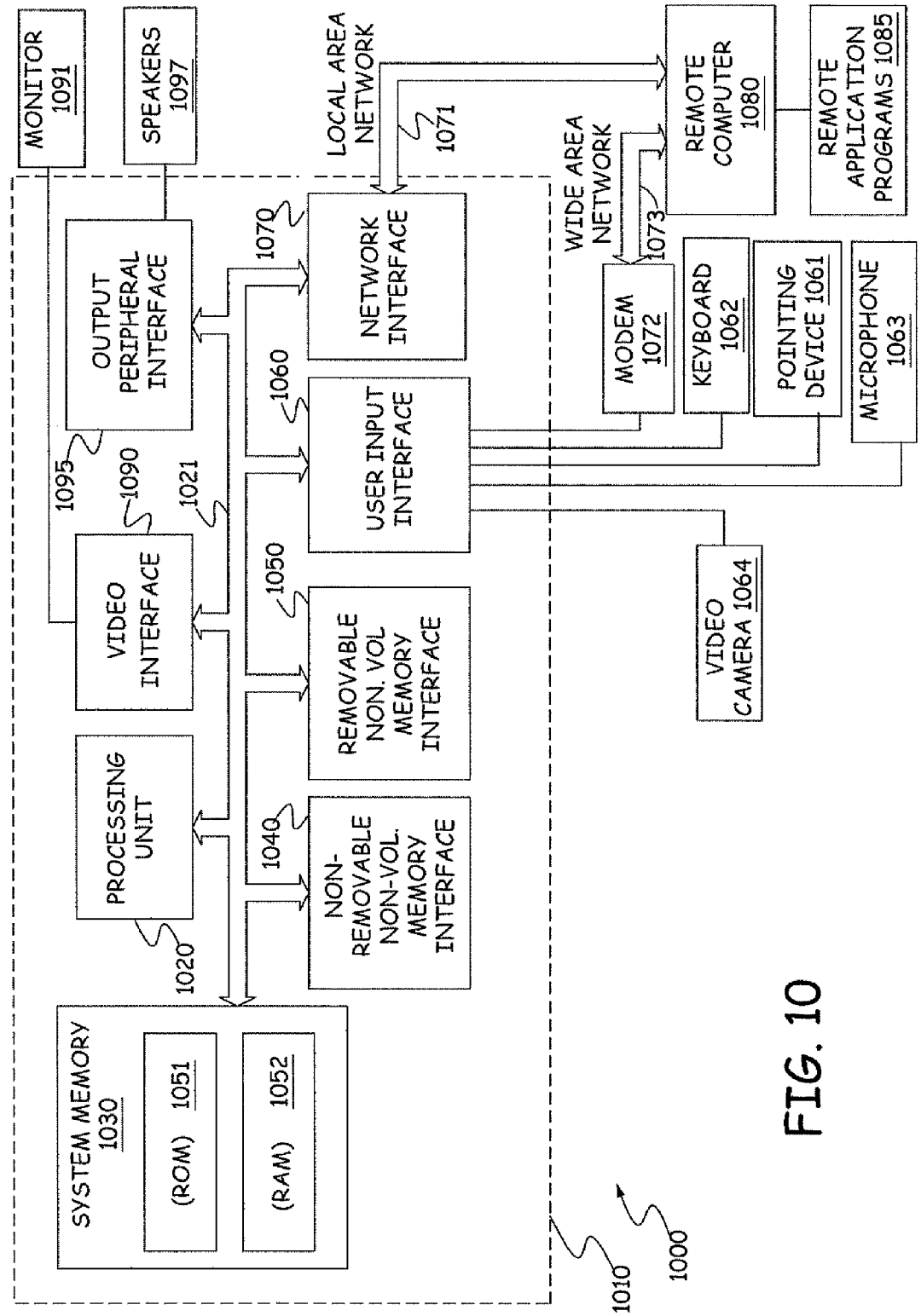
FIG. 10 is a block diagram illustrating one computing environment in which some embodiments may be practiced.

The above description of illustrative embodiments is described in accordance with an environment for transforming grammars and processing input text for analysis. Below is an exemplary computing environment that can incorporate and benefit from the concepts discussed above. The computing environment shown in FIG. 10 is one such example that can be used to implement the transformation of grammars and/or analyze input sentences In FIG. 10, the computing system environment 1000 is only one example of a suitable computing environment and is not intended to suggest any limitation as to the scope of use or functionality of the claimed subject matter. Neither should the computing environment 1000 be interpreted as having any dependency or requirement relating to any one or combination of components illustrated in the exemplary computing environment 1000.

Computing environment 1000 illustrates a general purpose computing system environment or configuration. Examples of well-known computing systems, environments, and/or configurations that may be suitable for use with the service agent or a client device include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Concepts presented herein may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

Exemplary environment 1000 for implementing the above embodiments includes a general-purpose computing system or device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data.

The system memory 1030 includes computer storage media in the form of volatile and/or nonvolatile memory such as read only memory (ROM) 1031 and random access memory (RAM) 1032. The computer 1010 may also include other removable/non-removable volatile/nonvolatile computer storage media. Non-removable non-volatile storage media are typically connected to the system bus 1021 through a non-removable memory interface such as interface 1040. Removeable non-volatile storage media are typically connected to the system bus 1021 by a removable memory interface, such as interface 1050.

A user may enter commands and information into the computer 1010 through input devices such as a keyboard 1062, a microphone 1063, a pointing device 1061, such as a mouse, trackball or touch pad, and a video camera 1064. These and other input devices are often connected to the processing unit 1020 through a user input interface 1060 that is coupled to the system bus, but may be connected by other interface and bus structures, such as a parallel port or a universal serial bus (USB). A monitor 1091 or other type of display device is also connected to the system bus 1021 via an interface, such as a video interface 1090. In addition to the monitor, computer 1010 may also include other peripheral output devices such as speakers 1097, which may be connected through an output peripheral interface 1095.

The computer 1010, when implemented as a client device or as a service agent, is operated in a networked environment using logical connections to one or more remote computers, such as a remote computer 1080. The remote computer 1080 may be a personal computer, a hand-held device, a server, a router, a network PC, a peer device or other common network node, and typically includes many or all of the elements described above relative to the computer 1010. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on remote computer 1080. It will be appreciated that the network connections shown are exemplary and other means of establishing a communications link between computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
accessing, with a processor, a dependency grammar;
accessing context-free grammar production schemata;
instantiating the context-free grammar production schemata according to dependencies specified in the dependency grammar;
pre-processing, with a processor, an input sentence to produce a sequence of tokens;
transforming, with a processor, the dependency grammar into a context-free grammar by collecting instances of the context-free grammar production schemata;
using a processor controlled parser to parse the sequence of tokens in accordance with the context-free grammar to provide an output, wherein parsing the sequence of tokens is accomplished between $O(n^3)$ and $O(n^4)$ time, where n is the number of tokens in the sequence; and
post-processing, with a processor, the output produced by the parser to indicate dependencies in the input sentence according to the dependency grammar.

2. The method of claim 1 wherein the context-free grammar comprises:
a terminal vocabulary that includes two distinct versions of a plurality of terminals that comprise a terminal vocabulary of the dependency grammar; and
a set of productions that, for each of the plurality of terminals of the dependency grammar, generates constituents that include the left dependencies of the terminal and one of the two distinct versions of the terminal, and further generates constituents that include the right dependencies of the terminal and the other version of the terminal.

3. The method of claim 2 wherein pre-processing the input sentence comprises:
splitting the input sentence into a sequence of tokens such that each token corresponds to a terminal in the terminal vocabulary of the dependency grammar; and
replacing a plurality of tokens in the sequence with two tokens corresponding to the two distinct versions of the corresponding terminal.

4. The method of claim 2 wherein pre-processing the input sentence comprises:
splitting the input sentence into a sequence of tokens such that each token corresponds to a terminal in the terminal vocabulary of the dependency grammar; and
wherein parsing the sequence of tokens comprises requiring each token to be covered by the two distinct versions of the corresponding terminal.

5. The method of claim 1 and further comprising:
transforming the dependency grammar by performing the BASIC SPLIT-HEAD TRANSFORM.

6. The method of claim 1 and further comprising:
transforming the dependency grammar by performing the BILEXICAL SPLIT-HEAD TRANSFORM.

7. The method of claim 1 and further comprising:
transforming the dependency grammar by performing the ADJACENT SPLIT-HEAD TRANSFORM.

8. The method of claim 1 and further comprising:
transforming the dependency grammar by performing the DEPENDENT SPLIT-HEAD TRANSFORM.

9. The method of claim 1 and further comprising:
transforming the dependency grammar by performing a plurality of instances of unfold and fold transformation steps.

10. The method of claim 1 wherein pre-processing the input string of terminals includes replacing each terminal by its left variant and its right variant, for each terminal in the input string.

11. The method of claim 1 wherein parsing is performed by a parser modified so as to require that each terminal is generated by two distinct nonterminals.

12. The method of claim 2 wherein parsing is performed by a context-free grammar parser modified so as to require that each terminal is generated by both constituents including the left dependencies of the terminal and the terminal, and constituents including the right dependencies of the terminal and the terminal.

13. A computer storage medium having instructions that, when executed by a processor on a computer, analyze text by performing a method, comprising:
accessing a dependency grammar;
pre-processing an input sentence to produce a sequence of tokens;
transforming, with the processor, the dependency grammar into a context-free grammar, the context-free grammar comprising a terminal vocabulary that includes two distinct versions of a plurality of terminals that comprise a terminal vocabulary of the dependency grammar, the context-free grammar also comprising a set of productions that, for each of the plurality of terminals of the dependency grammar, generates constituents that include left dependencies of the terminal and one of the two distinct versions of the terminal, and further generates constituents that include right dependencies of the terminal and the other version of the terminal;

using a parser to parse the sequence of tokens in accordance with the context-free grammar to provide an output, the parser parsing the sequence of tokens between $O(n^3)$ and $O(n^4)$ time, where n is the number of tokens in the sequence; and post-processing the output produced by the parser to indicate dependencies in the input sentence according to the dependency grammar.

14. The computer storage medium of claim 13 wherein pre-processing the input sentence comprises:

splitting the input sentence into a sequence of tokens such that each token corresponds to a terminal in the terminal vocabulary of the dependency grammar; and replacing a plurality of tokens in the sequence with two tokens corresponding to the two distinct versions of the corresponding terminal.

15. The computer storage medium of claim 14 wherein pre-processing the input sentence comprises:

splitting the input sentence into a sequence of tokens such that each token corresponds to a terminal in the terminal vocabulary of the dependency grammar; and wherein parsing the sequence of tokens comprises requiring each token to be covered by the two distinct versions of the corresponding terminal.

16. A system, comprising:

a dependency grammar;

a pre-processing module that processes a sentence to produce a sequence of tokens, the pre-processing module splitting the input sentence into the sequence of tokens such that each token corresponds to a terminal in a terminal vocabulary of the dependency grammar, the pre-processing module also replacing a plurality of tokens in the sequence with two tokens corresponding to two distinct versions of the corresponding terminal;

a grammar transformation module that transforms the dependency grammar into a context-free grammar;

a context-free grammar parser that accesses the context-free grammar to parse the sequence of tokens in accordance with the context-free grammar to provide an output, wherein the context free grammar is structured such that the context-free grammar parser parses the sequence of tokens, between $O(n^3)$ and $O(n^4)$ time, where n is the number of tokens;

a post-processing module that processes the output to indicate dependencies in the input sentence according to the dependency grammar; and a processor, being a functional element of the system, activated by the preprocessing module to produce the sequence of tokens, by the grammar transformation module to transform the dependency grammar into the context free grammar, and by the context-free grammar parser to parse the sequence of tokens in accordance with the context-free grammar.

17. The system of claim 16 wherein the context-free grammar comprises:

a terminal vocabulary that includes two distinct versions of a plurality of terminals that comprise a terminal vocabulary of the dependency grammar; and a set of productions that, for each of the plurality of terminals of the dependency grammar, generates constituents that include the left dependencies of the terminal and one of the two distinct versions of the terminal, and further generates constituents that include the right dependencies of the terminal and the other version of the terminal.

18. The system of claim 17 wherein parsing the sequence of tokens comprises requiring each token to be covered by the two distinct versions of the corresponding terminal.

\* \* \* \* \*